United States Patent
Chan et al.

(10) Patent No.: US 7,389,293 B2
(45) Date of Patent: Jun. 17, 2008

(54) REMASTERING FOR ASYMMETRIC CLUSTERS IN HIGH-LOAD SCENARIOS

(75) Inventors: Wilson Wai Shun Chan, San Mateo, CA (US); Angelo Pruscino, Los Altos, CA (US); Stefan Roesch, San Mateo, CA (US); Michael Zoll, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 11/061,796

(22) Filed: Feb. 17, 2005

(65) Prior Publication Data

US 2005/0149540 A1    Jul. 7, 2005

Related U.S. Application Data

(63) Continuation-in-part of application No. 11/024,347, filed on Dec. 27, 2004, now Pat. No. 7,080,075, and a continuation-in-part of application No. 09/746,580, filed on Dec. 20, 2000, now Pat. No. 6,965,893.

(51) Int. Cl.
  *G06F 17/30* (2006.01)
(52) U.S. Cl. ............... 707/8; 707/9; 707/10; 707/100; 707/101
(58) Field of Classification Search ............... None
  See application file for complete search history.

(56) References Cited

U.S. PATENT DOCUMENTS

| | | | |
|---|---|---|---|
| 5,410,697 A | 4/1995 | Baird et al. | |
| 5,440,732 A | 8/1995 | Lomet et al. | |
| 5,539,883 A | * 7/1996 | Allon et al. | ............ 718/105 |
| 5,551,046 A | 8/1996 | Mohan et al. | |
| 5,596,754 A | 1/1997 | Lomet | |
| 5,612,865 A | 3/1997 | Dasgupta | |
| 5,682,537 A | 10/1997 | Davies et al. | |
| 5,822,531 A | 10/1998 | Gorczyca et al. | |
| 5,991,768 A | 11/1999 | Sun et al. | |
| 6,014,669 A | 1/2000 | Slaughter et al. | |

(Continued)

OTHER PUBLICATIONS

European Patent Office, "Communication pursuant to Article 96(2) EPC," Dated Feb. 11, 2005 (Nov. 2, 2005), 6 pages.

(Continued)

*Primary Examiner*—Khanh B. Pham
(74) *Attorney, Agent, or Firm*—Hickman Palermo Truong & Becker LLP; Christian A. Nicholes

(57) ABSTRACT

Techniques are provided for remastering resources based on node utilization. According to one such technique, resources are remastered in response to the over-utilization of the node that currently masters those resources. The utilization of each node is tracked, and when a particular node's utilization exceeds a specified threshold, selected resources that are currently mastered by that node are remastered so that nodes other than the particular node become the new masters for the selected resources. Each node's utilization is based on that node's capacity, and each node's capacity may differ. According to an aspect of one technique, each node's capacity is based on that node's processing resources and memory resources. Remastering resources in this manner tends to reduce the average amount of time taken for nodes to handle requests for the resources that they master.

14 Claims, 4 Drawing Sheets

U.S. PATENT DOCUMENTS

| | | | |
|---|---|---|---|
| 6,058,389 | A | 5/2000 | Chandra et al. |
| 6,081,900 | A | 6/2000 | Subramaniam et al. |
| 6,108,654 | A | 8/2000 | Chan et al. |
| 6,185,601 | B1 * | 2/2001 | Wolff ........................ 709/203 |
| 6,253,273 | B1 | 6/2001 | Blumenau |
| 6,272,491 | B1 * | 8/2001 | Chan et al. ................... 707/8 |
| 6,363,396 | B1 * | 3/2002 | Klots et al. ............. 707/103 Y |
| 6,449,734 | B1 | 9/2002 | Shrivastava et al. |
| 6,453,404 | B1 | 9/2002 | Bereznyi et al. |
| 6,529,906 | B1 | 3/2003 | Chan |
| 6,920,454 | B1 | 7/2005 | Chan |
| 7,085,911 | B2 | 8/2006 | Sachedina et al. |
| 7,203,748 | B2 | 4/2007 | Hare et al. |
| 7,246,120 | B2 | 7/2007 | Chan et al. |
| 2002/0194015 | A1 | 12/2002 | Gordon et al. |
| 2004/0243578 | A1 | 12/2004 | Chan et al. |
| 2006/0143178 | A1 | 6/2006 | Chan et al. |

OTHER PUBLICATIONS

Current Claims, EP 99 968 071.3, 8 pages.

Oracle Corporation, "Oracle8i Supplied Packages Reference, Release 8.1.5," Title page, Feb. 1999, located at http://www.csee.umbc.edu/help/oracle8/server.815/a68001/title.htm, 2 pages.

Oracle Corporation, "Oracle8i Supplied Packages Reference, Release 8.1.5," Table of Contents, Feb. 1999, located at http://www.csee.umbc.edu/help/oracle8/server.815/a68001/toc.htm, 22 pages.

Oracle Corporation, "DBMS_Offline_OG," Oracle8i Supplied Packages Reference, Release 8.1.5, Feb. 1999, located at http://www.csee.umbc.edu/help/oracle8/server.815/a68001/dbms_off.htm, 7 pages.

Dye, Charles, Oracle Distributed Systems, Chapter 12—"Multi-Master Replication" (O'Reilly & Associates, Inc. © Apr. 1999).

Kirkland, Bob, Domino System Administration, Chapter 9—"Replication" (New Riders Publishing © 2000).

Mahapatra, Tushar et al., Oracle Parallel Processing, Chapter 12—"Application Failover" (O'Reilly & Associates, Inc. © Aug. 2000).

Rahm, E., "Concurrency and Coherency Control in Database Sharing Systems" (1993) pp. 1-62.

European Patent Office, "European Search Report", application No. 07106281.4—2211, dated Jul. 27, 2007, 8 pages.

Claims, application No. 07106281.4—2211, 2 pages.

Khalidi, Yousef A., et al., "Solaris MC: A Multi-Computer OS", Sun Microsystems, XP-002437395, Proceedings of the USENIX 1996 annual technical conference, published Jan. 1996, 18 pages.

Matena, Vlada, et al., "Solaris MC File System Framework", Sun Microsystems, XP-002437394, retrieved from website <http://research.sun.com/techrep/1996/smli_tr-96-57.pdf>, dated Oct. 1996, 20 pages.

* cited by examiner

REMASTERING FOR ASYMMETRIC CLUSTERS IN HIGH-LOAD SCENARIOS

CLAIM OF PRIORITY

The present application claims domestic priority under 35 U.S.C. § 120 as a continuation-in-part of the following patent applications that were co-pending as of the present application's filing:

U.S. patent application Ser. No. 09/746,580 (now U.S. Pat. No. 6,965,893), entitled "TECHNIQUES FOR GRANTING SHARED LOCKS MORE EFFICIENTLY" and filed Dec. 20, 2000, by Wilson Wai Shun Chan and Michael Zoll; and U.S. patent application Ser. No. 11/024,347 (now U.S. Pat. No. 7,080,075), entitled "DYNAMIC REMASTERING FOR A SUBSET OF NODES IN A CLUSTER ENVIRONMENT" and filed Dec. 27, 2004, by Wilson Wai Shun Chan, Angelo Pruscino, Stefan Roesch, and Michael Zoll; the entire contents of each of which are incorporated by reference for all purposes as though fully disclosed herein.

FIELD OF THE INVENTION

The present invention relates to multi-node systems and, more specifically, to remastering resources within multi-node systems.

BACKGROUND

Database servers use resources while executing transactions. Even though resources may be shared between database servers, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

Resource Mastery

FIG. 1 is a block diagram of a multiple-node computer system 100. Each node is executing an instance of a database server and a portion of a distributed resource management system 132. Specifically, the illustrated system includes three nodes 102, 112 and 122 on which reside database servers 104, 114 and 124, respectively, and resource manager units 106, 116 and 126, respectively. Database servers 104, 114 and 124 have access to the same database 120. The database 120 resides on a disk 118 that contains multiple blocks of data. Disk 118 generally represents one or more persistent storage devices that may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, then the communication mechanism will be different than if the nodes 102, 112, and 122 were to correspond to clusters of processors and memory within a multi-processing machine.

According to one control mechanism, before a database server can access a resource such as a data block, the database server must obtain the resource if the resource is not already located on the database server's node. The resource might need to be obtained from another node in which the resource is currently located, or from shared storage such as disk 118 if the resource is not currently located in the volatile memory of any node.

Resource management system 132 stores data structures that indicate, for each resource, the node on which the resource is currently located. According to one approach, resource management system 132 maintains a separate master resource object for each resource managed by resource management system 132, and includes one resource manager unit for each node that contains a database server. The master resource object for a particular resource stores, among other things, an indication of which node currently has the particular resource. Although separate master resource objects may reside within separate resource manager units, no master resource object resides within more than one resource manager unit.

The node on which a resource manager unit resides is referred to as the "master node" (or simply "master") of the resources whose master resource objects are managed by that resource manager unit. Thus, if the master resource object for a resource R1 is managed by resource manager unit 106, then node 102 is the master of resource R1.

Each node has access to information that indicates, for each resource, which resource manager unit manages that resource. When a "requester" node wants to acquire a resource that it does not currently have, and the requestor node is not the resource's master, then the requestor node requests the resource from the resource's master. The resource's master receives the request.

If the resource is located on another node, called the "holder" node, then the resource's master forwards the request to the holder node. The holder node receives the request and, if permissible, sends the resource to the requestor node. Alternatively, if the resource is not currently located on any node, then the resource's master simply grants the requestor node permission to retrieve the resource from disk 118. In any case, after the requestor node obtains the resource, the resource's master updates the data structures that indicate where the resource is.

Remastering Resources

Changing the master of a resource from one node to another is referred to as "remastering" the resource. Various techniques have been developed for efficiently performing remastering operations. Such techniques are described, for example, in the following documents, the entire contents of which are incorporated herein:

U.S. Pat. No. 6,272,491, entitled "Method And System For Mastering Locks In A Multiple Server Database System";

U.S. Pat. No. 6,529,906, entitled "Techniques For DLM Optimization With Re-Mastering Events";

U.S. patent application Ser. No. 09/967,856, entitled "Techniques For Adding A Master In A Distributed Database Without Suspending Database Operations At Extant Master Sites"; and U.S. patent application Ser. No. 10/832,527, entitled "Techniques for Multiple Window Resource Remastering Among Nodes of a Cluster".

When a resource is remastered, the information that indicates which node is the resource's master is updated to indicate the resource's new master instead of the resource's old master. From that moment, requester nodes send requests for the resource to the resource's new master rather than the resource's old master.

There are a variety of reasons that it may be useful to remaster a resource. For example, it costs significantly less for processes to interact with a resource management unit that resides on their same local node, than to interact with resource management units on other nodes. Therefore, one reason to remaster a resource is to establish the master of the resource to be the node that most frequently requests the resource.

The access patterns of individual resources are often just a reflection of the access patterns of the larger sets of related resources to which the individual resources belong. In the context of a database server, for example, the access patterns of individual disk blocks may just be a reflection of the access patterns of the tables whose data is stored on those disk blocks.

For example, consider a database system where ten database servers are used to access a shared database. Assume further that the users, which have permission to access a particular table of the database, usually connect to the database through a particular database server. In this case, it is likely that the data blocks that store the rows of that particular table will be primarily accessed by the node on which that particular database server is running. Under these circumstances, it would be inefficient to have mastery of those data blocks spread evenly across all ten of the database servers.

To avoid such inefficiency, the particular node may be assigned to be the master of all data blocks of that particular table. Under these circumstances, operations involving that table would not incur the overhead of inter-node communication, as long as all access to the table was made through that particular database server.

Asymmetrical Capacity and Utilization

In many multiple-node computer systems, the nodes have different capacities. A node's capacity is based on that node's processing power and memory reserves. For example, node 102 may have more processing power and more memory reserves than node 112, and node 112 may have more processing power and more memory reserves than node 122. In this scenario, node 102 has a greater capacity than node 112, and node 112 has a greater capacity than node 122. When any two nodes of a multiple-node computer system have unequal capacities, the multiple-node computer system is "asymmetrical."

A resource manager unit might be just one of many processes that a master node executes at a time. A particular node might be executing many other processes concurrently with a resource manager unit that handles requests from other nodes as discussed above. Some processes may utilize a node's processors and memory more than others. As a node's processors and memory become more and more utilized, the resource manager unit on that node handles requests more slowly. On a very highly utilized node, the resource manager unit may handle requests very slowly. Consequently, nodes that request resources from the highly utilized node are forced to wait longer periods of time for their requests to be handled. The performance of the entire system may be degraded.

Due to asymmetrical capacity and the priorities of existing resource mastery techniques, it is possible for a node that has relatively low capacity and relatively high utilization to become the master for many of a system's resources, even while other nodes that have relatively high capacity and relatively low utilization are masters of few of the system's resources. Such a situation is less than ideal.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques disclosed herein, resources are remastered in response to the over-utilization of the node that currently masters those resources. The utilization of each node is tracked, and when a particular node's utilization exceeds a specified threshold, selected resources that are currently mastered by that node are remastered so that nodes other than the particular node become the new masters for the selected resources. Each node's utilization is based on that node's capacity, and each node's capacity may differ.

As a result of the above techniques, requests for resources tend to be more intelligently distributed among nodes, so that the time required for each request to be handled does not become excessive. Because a node's utilization is partially based on that node's capacity, nodes with greater capacity may be made masters of more resources than nodes with lesser capacity; nodes with greater capacity may be less utilized, on average, than nodes with lesser capacity. However, because resource remastery occurs in response to over-utilization, even resources that are mastered by a node with relatively high capacity may be remastered to nodes with lesser capacity if that node becomes over-utilized despite its high capacity.

Utilization-based Remastering

Figure 2:
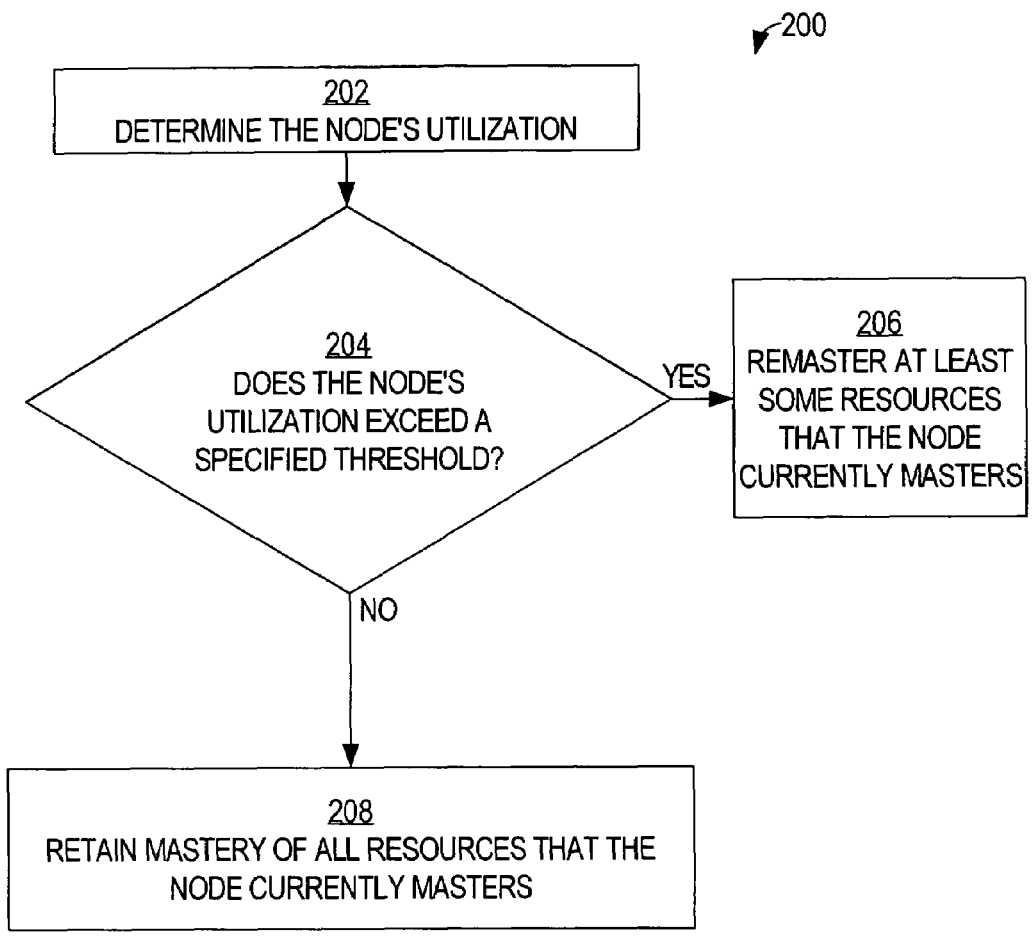
FIG. 2 is a flow diagram that illustrates a technique for determining whether to remaster resources that are mastered by a particular node, according to an embodiment of the invention.

FIG. 2 is a flow diagram that illustrates a technique for determining whether to remaster resources that are mastered by a particular node, according to an embodiment of the invention. In block 202, the utilization of the node is determined. For example, node 102 may determine to what extent node 102 is being utilized. The utilization of node 102 is based on the capacity of node 102, and the capacity of node 102 is based on such factors as the number of processors in node 102, the speed of the processors in node 102, and the amount of memory in node 102. A node's utilization may be expressed as a percentage of how much of the node's total capacity is currently being used. A node's utilization may be computed as a moving average over a "sliding window" of time rather than as a single value at a single instance in time.

In block 204, it is determined whether the node's utilization exceeds a specified threshold. For example, the threshold might be 80%. If so, then node 102 may determine whether the utilization of node 102 exceeds 80%. If the node's utilization exceeds the specified threshold, then control passes to block 206. Otherwise, control passes to block 208.

In block 206, one or more resources that are currently mastered by the node are remastered so that one or more other nodes master those resources instead. For example, the mastery of some or all of the resources that are currently mastered by node 102 may be divided among nodes 112 and 122, so that node 102 is no longer the master of the remastered resources. For example, if 100 resources currently mastered by node 102 are remastered, then node 112 may be designated as the new master of 50 of those resources, and node 122 may be designated as the new master of the other 50 of those resources. Ideally, each of the new masters is less utilized than the old master. The resources themselves need not change locations as a consequence of the remastering operation.

Alternatively, in block 208, the node retains the mastery of all of the resources that the node currently masters. For example, in response to determining that node 102 is not over-utilized, node 102 may retain mastery of all of the resources that node 102 currently masters.

In one embodiment, the utilization of a node is determined by multiplying the unused processing cycles of the node by one specified weight to produce one product, multiplying the unused memory of the node by another specified weight to produce another product, and then adding the products together.

In one embodiment, a node's utilization is determined at least in part based on the average amount of time that the node takes to handle requests for resources that the node masters. The longer the average amount of time that the node takes to handle such requests, the higher the node's utilization is considered to be.

Selecting Which Resources to Remaster

Figure 3:
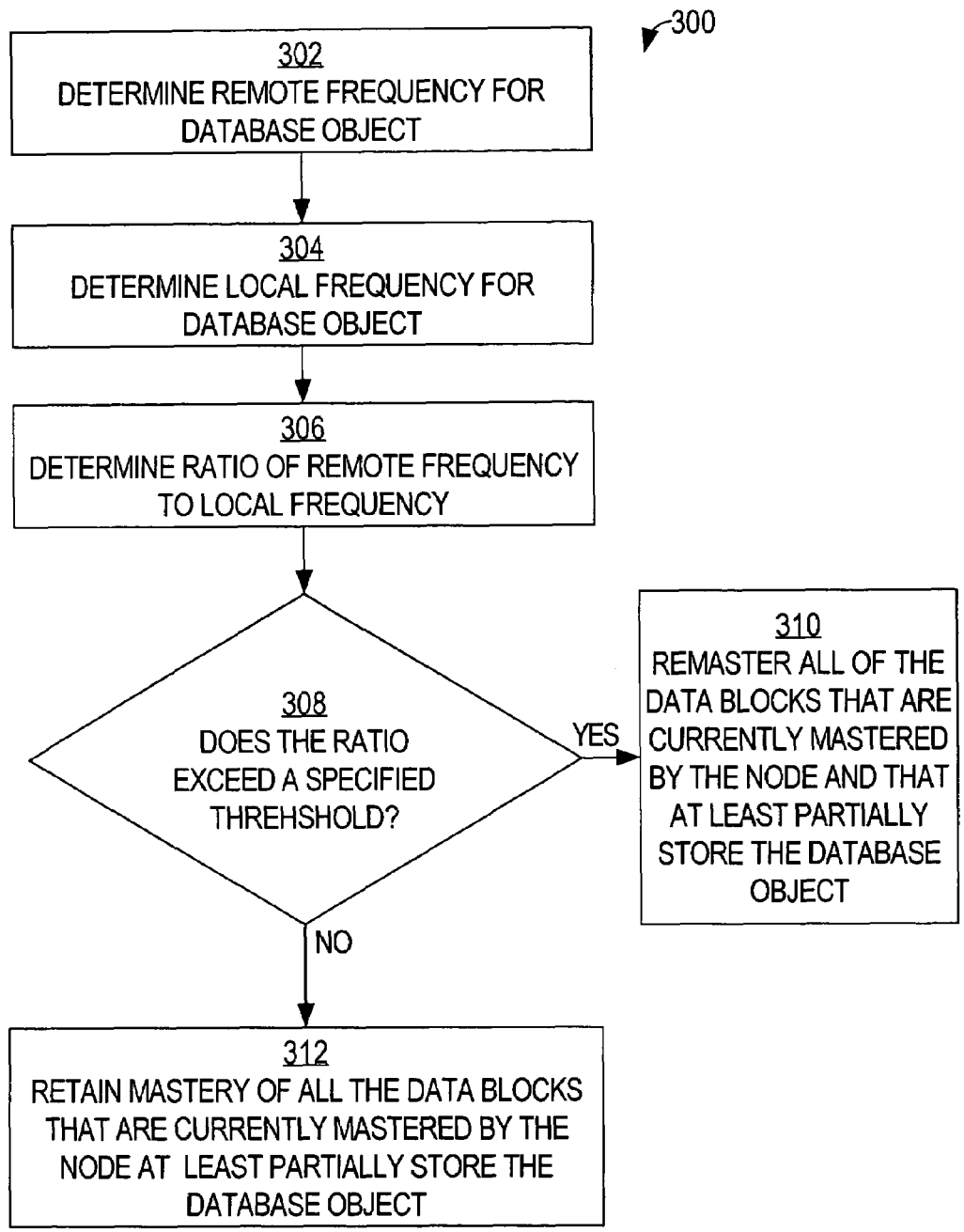
FIG. 3 is a flow diagram that illustrates a technique for selecting which resources are to be remastered.

Even if a determination is made to remaster one or more resources that a node currently masters, as described above, it is often not necessary or even beneficial to remaster all of the resources that the node currently masters. FIG. 3 is a flow diagram that illustrates a technique for selecting which resources are to be remastered.

The technique illustrated in FIG. 3 refers to data blocks as examples of resources, although not all resources are necessarily data blocks. A database object, such as a database table, may be stored as multiple separate portions, with each portion stored within a separate data block. According to one embodiment, if any of the data blocks that are mastered by a particular node and that at least partially store a particular database object are selected to be remastered, then all of the data blocks that are mastered by the particular node and that also at least partially store the particular database object are also selected to be remastered. This reduces the fragmentation of a database object's corresponding data blocks among multiple nodes, although such fragmentation is permissible.

Thus, according to the technique described below, the selection made is actually of database objects. When a database object is selected, then all of the database object's corresponding data blocks that are mastered by the node on which the selection is made are selected as a result.

According to one embodiment, statistical access information is maintained on each node for each database object that is at least partially stored in a data block that is currently mastered by that node. More specifically, on each particular node, two separate frequencies are tracked for each such database object: the frequency with which other nodes request those of the object's corresponding blocks that the particular node masters (the "remote frequency"), and the frequency with which database servers executing on the particular node access those of the object's corresponding blocks that the particular node masters (the "local frequency"). For each such database object, a ratio of the object's remote frequency to the object's local frequency is determined. If the ratio for a database object exceeds a specified threshold, meaning that other nodes request the database object most frequently, then the database object is selected to be remastered.

An over-utilized node may perform the technique illustrated in FIG. 3 for each database object that is at least partially stored in a data block that is currently mastered by the node. In block 302, the remote frequency for the database object is determined. In block 304, the local frequency for the database object is determined. In block 306, the ratio of the remote frequency to the local frequency is determined.

In block 308, it is determined whether the ratio exceeds a specified threshold. For example, if the specified threshold is 70%, then node 102 may determine whether the ratio for a particular database object exceeds 70%; that is, node 102 may determine whether more than 70% of the requests for data blocks that at least partially store the particular database object originate from other nodes. If the ratio exceeds the specified threshold, then control passes to block 310. Otherwise, control passes to block 312.

In block 310, all of the data blocks that are currently mastered by the node and that at least partially store the database object are remastered to one or more other nodes. For example, all of the data blocks that node 102 masters and that store at least a portion of the particular database object may be remastered to nodes 112 and 122. None of the data blocks that store any portion of the particular database object remain mastered by node 102, although other data blocks that do not store any portion of the particular database object may remain mastered by node 102.

Alternatively, in block 312, mastery of all of the data blocks that are currently mastered by the node and that at least partially store the database object remain mastered by the node. For example, node 102 may retain mastery of all of the data blocks that node 102 masters and that store at least a portion of the particular database object. None of the data blocks that are mastered by node 102 and that store any portion of the particular database object are remastered to other nodes, although other data blocks that do not store any portion of the particular database object may be remastered to other nodes.

Thus, data blocks that store database objects that are more frequently requested by nodes other than the data blocks' master may be remastered to other nodes, while data blocks that store database objects that are more frequently accessed by database servers resident on the data blocks' master may not be remastered.

Preventing Over-frequent Remastering

It is possible for a new master for a set of resources to become over-utilized shortly after becoming the new master for the set of resources. This may occur, for example, if several processes are started on the new master after mastery of the set of resource has changed. When such a scenario occurs, it may be undesirable to remaster the set of resources again immediately, because some communication overhead is involved in remastering resources. When remastering is performed too often, the multi-node computer system may experience significant performance degradation.

Consequently, it may be desirable to prevent a set of resources from being remastered over and over again in rapid succession. Therefore, in one embodiment, whenever a resource is remastered, an indication of when the resource was last remastered is stored (the "last remastery indication"). The last remastery indication may be stored in the resource's corresponding master resource object, for example. Whenever a resource is selected for remastering, as discussed above, the last remastery indication for the resource is inspected before the resource is remastered. If the amount of time that has passed since the resource was last remastered is less than a specified amount of time—five minutes, for example—then the resource is not remastered even though it otherwise qualifies for remastering. The resource may be remastered at a later time if the resource's master is still over-utilized at that time.

Selecting Which Target Nodes are to be New Masters

As is discussed above, if certain conditions are satisfied, then a set of resources may be remastered from an over-utilized node to one or more other "target" nodes, which become the new masters for the set of resources as a result of the remastering operation. However, if the new masters are also over-utilized, then the remastering operation might have little beneficial effect. Therefore, it is desirable to ensure that the target nodes selected to be the new masters for a set of resources are not also over-utilized.

Although many different techniques may be used to select target nodes for a remastering operation, target nodes are selected in the following manner according to one embodiment. For each node other than the selected resources' current master, the utilization of that node is determined. The utilization of each node may be determined in the same manner that the utilization of the current master was determined, as described above. Then, for each such node, it is determined whether that node's utilization exceeds a specified threshold. Any such nodes whose utilizations exceed the specified threshold are excluded from consideration as target nodes for the remastering operation.

The remaining nodes become target nodes for the remastering operation. The selected resources are divided into as many groups as there are target nodes. In one embodiment, the selected resources are divided approximately evenly among the target nodes, so that each target node is assigned approximately the same amount of resources. In an alternative embodiment, each target node is assigned a weight based on its utilization, and each target node is assigned an amount of resources based on the target node's weight; nodes having lesser utilization may be assigned more resources than nodes having greater utilization.

After a target node has been assigned for each selected resource, the selected resources are remastered based on the assignments, so that the target nodes become the new masters of the selected resources.

Initial Master Assignment

Figure 1:
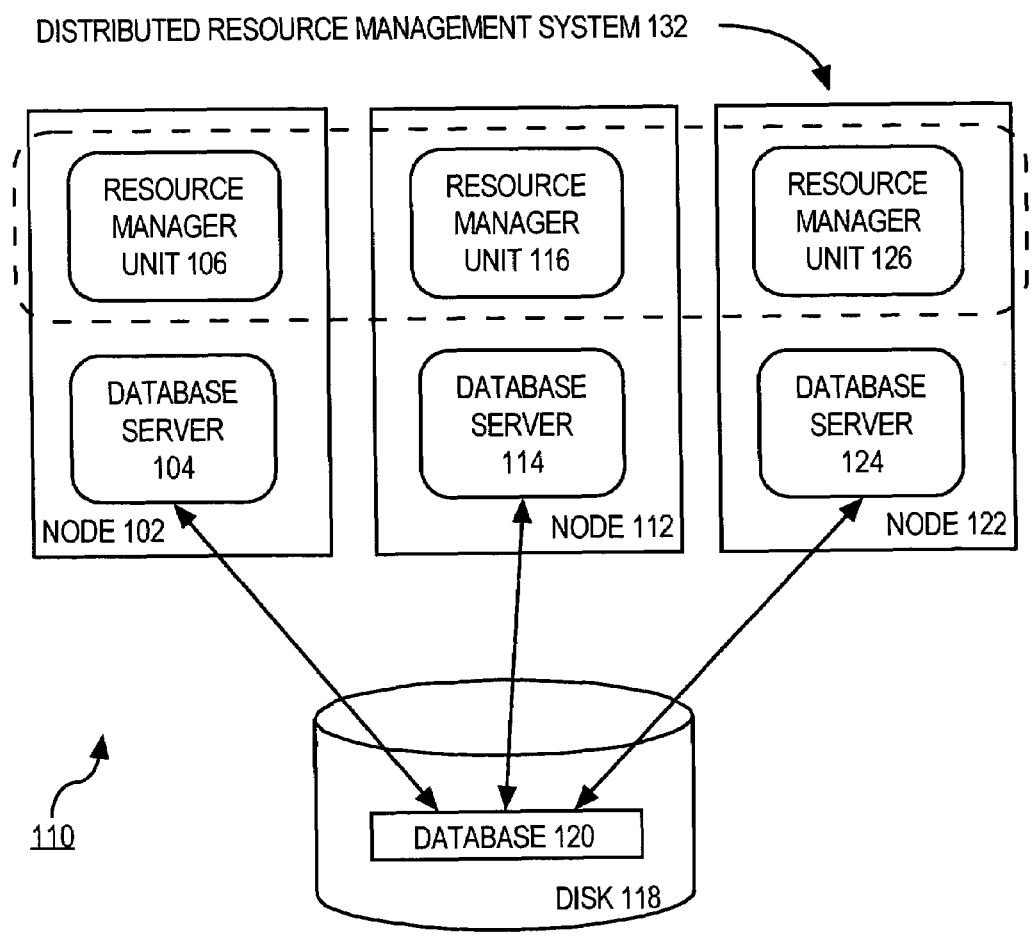
FIG. 1 is a block diagram of a multiple-node computer system.

When database 120, shown in FIG. 1, initializes, each of the resources in database 120 is assigned an initial master. For example, each of nodes 102, 112, and 122 may be designated as the initial master for a different set of data blocks stored in database 120. Many different techniques may be used to assign initial masters for the resources.

According to one technique, initial masters are determined by using a hash function. For example, some value in each data block, such as an identifier, may be input into a hash function that produces a hash value that corresponds to one of the nodes. The node corresponding to the hash value is designated as the data block's master. This technique tends to distribute mastery of resources evenly among the nodes. However, because some nodes might have a greater capacity than other nodes, this technique may be less than ideal under many circumstances.

According to another technique, initial masters are determined based on each node's capacity. Each node is assigned a weight that is based on that node's capacity; techniques for determining a node's capacity are discussed above. Nodes that have a higher capacity may be assigned more resources than nodes that have a lesser capacity. Consequently, nodes with less capacity, which are more likely to become over-utilized, are initially made masters of relatively few resources, while nodes with more capacity, which are less likely to become over-utilized, are initially made masters of relatively many resources. As a result, a longer amount of time may pass before a remastering operation is performed.

Hardware Overview

Figure 4:
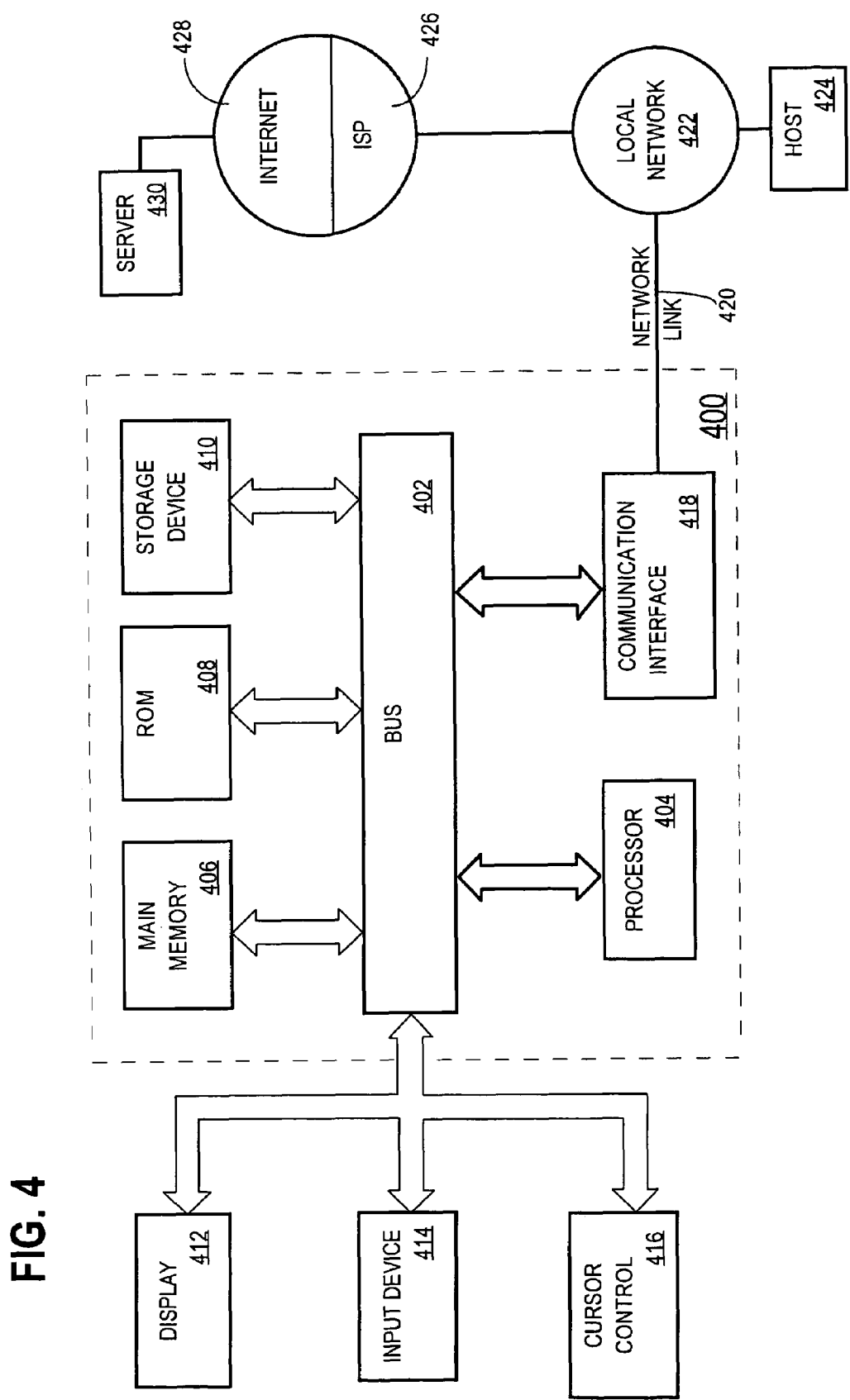
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410; such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

Processor 404 may execute the received code as the code is received, and/or store the received code in storage device 410 or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for remastering resources, the method comprising:
   determining a utilization of a first node that is executing a first database server that has been designated to be a master for one or more resources;
   wherein the one or more resources are disk blocks of a database;
   wherein the first database server is one of a plurality of database servers that have access to the disk blocks of the database;
   wherein the first database server, as the master of the one or more resources, maintains lock information that indicates locks that have been granted, by the first database server, to access the one or more resources; and
   based on the utilization, designating a second database server, executing on a node other than the first node, to be a master for the one or more resources, so that the first database server is no longer designated to be a master for the one or more resources;

wherein the step of designating comprises:
selecting a particular database object from among one or more database objects that are at least partially stored within one or more data blocks for which the first database server is designated to be a master; and
for each particular data block that is mastered by the first database server and that stores at least a portion of the particular database object: (a) selecting a particular node other than the first node, and (b) designating the master of the particular data block to be a database server executing on the particular node instead of the first database server;
wherein the step of selecting the particular database object comprises:
determining a first frequency at which requests for data blocks that store portions of the particular database object are received from nodes other than the first node;
determining a second frequency at which data blocks that store portions of the particular database object are accessed by a database server residing on the first node;
determining whether a ratio of the first frequency to the second frequency exceeds a specified threshold; and
in response to determining that the ratio exceeds the specified threshold, selecting the particular database object from among the one or more database objects.

2. A volatile or non-volatile computer-readable medium carrying one or more sequences of instructions which, when executed by one or more processors, causes the one or more processors to perform the method recited in claim 1.

3. A method for remastering resources, the method comprising:
determining a utilization of a first node that is executing a first database server that has been designated to be a master for one or more resources;
wherein the one or more resources are disk blocks of a database;
wherein the first database server is one of a plurality of database servers that have access to the disk blocks of the database;
wherein the first database server, as the master of the one or more resources, maintains lock information that indicates locks that have been granted, by the first database server, to access the one or more resources; and
based on the utilization, designating a second database server, executing on a node other than the first node, to be a master for the one or more resources, so that the first database server is no longer designated to be a master for the one or more resources;
wherein the step of designating comprises:
for each particular node other than the first node in a plurality of nodes:
determining whether a utilization of the particular node exceeds a specified threshold; and
if the utilization of the particular node does not exceed the specified threshold, then including the particular node in a set of target nodes;
dividing the one or more resources into as many groups as there are nodes in the set of target nodes; and
designating a database server executing on each node in the set of target nodes to be a master for a separate group obtained from the one or more resources.

4. The method of claim 3, wherein the utilization of the particular node is based on processing resources of the particular node and memory resources of the particular node.

5. A volatile or non-volatile computer-readable medium carrying one or more sequences of instructions which, when executed by one or more processors, causes the one or more processors to perform the method recited in claim 4.

6. The method of claim 3, wherein the step of designating comprises:
determining an amount of time that has passed since mastery of the one or more resources last changed;
determining whether the amount of time exceeds a specified threshold; and
in response to determining that the amount of time exceeds the specified threshold, designating the second database server to be a master for the one or more resources.

7. A volatile or non-volatile computer-readable medium carrying one or more sequences of instructions which, when executed by one or more processors, causes the one or more processors to perform the method recited in claim 6.

8. A volatile or non-volatile computer-readable medium carrying one or more sequences of instructions which, when executed by one or more processors, causes the one or more processors to perform the method recited in claim 3.

9. The method of claim 3, wherein:
the one or more resources are a subset of the resources mastered by the first database server; and
after the second database server has been designated master of the one or more resources, the first database server continues to master resources.

10. A volatile or non-volatile computer-readable medium carrying one or more sequences of instructions which, when executed by one or more processors, causes the one or more processors to perform the method recited in claim 9.

11. A method for remastering data blocks that are mastered by a first database server that executes on a first node of a plurality of nodes, the method comprising:
determining whether a utilization of the first node exceeds a first specified threshold;
if the utilization of the first node does not exceed the first specified threshold, then maintaining the first database server as master of all data blocks that were already mastered by the first database server; and
if the utilization of the first node exceeds the first specified threshold, then performing steps comprising:
selecting one or more particular database objects that are at least partially stored in data blocks that are mastered by the first database server, wherein selecting the one or more particular database objects is based on frequencies with which data blocks that at least partially store the one or more particular database objects are requested by database servers that execute on nodes other than the first node;
selecting one or more target nodes from among the plurality of nodes, wherein selecting the one or more target nodes is based on utilizations of the one or more target nodes, wherein the one or more target nodes exclude the first node;
for each particular data block that is mastered by the first database server and that stores at least a portion of the one or more particular database objects, changing mastery of the particular data block from the first database server to another database server that executes on a node within the one or more target nodes; and
maintaining the first database server as master of each data block that was already mastered by the first database server and that does not store at least a portion of the one or more particular database objects.

12. A volatile or non-volatile computer-readable medium carrying one or more sequences of instructions which, when executed by one or more processors, causes the one or more processors to perform the method recited in claim 11.

13. A method for remastering resources, the method comprising:
  determining a utilization of a first node that is executing a first database server that has been designated to be a master for one or more resources;
  wherein the one or more resources are disk blocks of a database;
  wherein the first database server is one of a plurality of database servers that have access to the disk blocks of the database;
  wherein the first database server, as the master of the one or more resources, maintains lock information that indicates locks that have been granted, by the first database server, to access the one or more resources; and
  based on the utilization, designating a second database server, executing on a node other than the first node, to be a master for the one or more resources, so that the first database server is no longer designated to be a master for the one or more resources;
  a particular disk block's master receiving a request from a third database server;
  the particular disk block's master determining, based on lock information for the particular disk block, that a fourth database server has been granted exclusive access to the particular disk block;
  in response to the particular disk block's master determining that the fourth database server has been granted exclusive access to the particular disk block, the particular disk block's master sending, to the fourth database server, a message that indicates that the third database server requests access to the particular disk block; and
  in response to the fourth database server receiving the message from the particular disk block's master, the fourth database server directly shipping a copy of the particular disk block to the third database server.

14. A volatile or non-volatile computer-readable medium carrying one or more sequences of instructions which, when executed by one or more processors, causes the one or more processors to perform the method recited in claim 13.

* * * * *

UNITED STATES PATENT AND TRADEMARK OFFICE
CERTIFICATE OF CORRECTION

PATENT NO. : 7,389,293 B2  
APPLICATION NO. : 11/061796  
DATED : June 17, 2008  
INVENTOR(S) : Chan et al.

Page 1 of 1

It is certified that error appears in the above-identified patent and that said Letters Patent is hereby corrected as shown below:

On sheet 3 of 4, in Figure 3, Ref. Numeral 308, line 3, delete "THREHSHOLD?" and insert -- THRESHOLD? --, therefor.

In column 2, line 30, delete ""requester"" and insert -- "requestor" --, therefor.

In column 3, line 2, delete "requester" and insert -- requestor --, therefor.

In column 8, line 52, delete "410;" and insert -- 410, --, therefor.

Signed and Sealed this

Seventh Day of July, 2009

JOHN DOLL  
*Acting Director of the United States Patent and Trademark Office*